United States Patent [19]

Feazel

[11] Patent Number: 4,681,854

[45] Date of Patent: Jul. 21, 1987

[54] GEOCHEMICAL OIL PROSPECTING METHOD USING IN SITU SIMULATION OF DIAGENETIC PROCESSES

[75] Inventor: Charles T. Feazel, Bartlesville, Okla.

[73] Assignee: Phillips Petroleum Company, Bartlesville, Okla.

[21] Appl. No.: 383,369

[22] Filed: May 28, 1982

[51] Int. Cl.⁴ .......................................... G01N 33/24
[52] U.S. Cl. ...................................... 436/31; 73/151; 166/250; 436/28
[58] Field of Search ............... 73/86, 151; 166/250; 250/252.1, 306–307; 436/28–31, 4–6

[56] References Cited

U.S. PATENT DOCUMENTS

| | | | |
|---|---|---|---|
| 2,345,219 | 3/1944 | Sanderson | 422/88 X |
| 3,031,571 | 4/1962 | Fearon | 250/307 X |
| 3,495,438 | 2/1970 | Mangum | 73/19 |
| 3,596,089 | 7/1971 | Borst | 436/4 X |
| 3,626,482 | 12/1971 | Billere | 175/25 |
| 3,766,993 | 10/1973 | Fertl et al. | 175/50 |
| 3,766,994 | 10/1973 | Fertl | 175/50 |
| 3,802,259 | 4/1974 | Eckels | 73/153 X |
| 4,052,885 | 10/1977 | Shuck | 73/38 |
| 4,304,122 | 12/1981 | Tentor | 73/38 |

*Primary Examiner*—David L. Lacey
*Assistant Examiner*—Michael S. Gzybowski
*Attorney, Agent, or Firm*—French and Doescher

[57] ABSTRACT

A process for in situ simulation of diagenetic processes in a subterranean formation is provided. A mineral substrate is placed in the formation of interest in a sealed vessel. The vessel is opened so as to expose the mineral substrate to formation fluids. After sufficient time for the formation fluids to act upon the mineral substrate, the substrate is removed from the formation and is examined for physical and chemical effects indicative of porosity changes in the formation.

9 Claims, 4 Drawing Figures

GEOCHEMICAL OIL PROSPECTING METHOD USING IN SITU SIMULATION OF DIAGENETIC PROCESSES

BACKGROUND OF THE INVENTION

The present invention relates to geochemical oil prospecting. It further relates to methods of predicting the nature of an oil-bearing reservoir.

As primary reserves of oil become scarcer and the expense of finding and recovering oil from remote locations or post-primary sources increases, it becomes more important to be able to determine the conditions present within oil-bearing formations as an aid in predicting the likelihood that oil is located in those formations.

Diagenesis includes all processes that convert sediments to rocks between the time of deposition and the onset of thermal metamorphism. Diagnetic processes can be modeled by laboratory-scale experiments, but these involve many assumptions about subsurface conditions that may not be accurate.

One of the reservoir conditions which is significant in predicting oil is the porosity of the reservoir rock. Porous rock is a condition of the presence of oil. The porosity of reservoir rock may change due to the effects of reservoir fluids on the rock surfaces. As a formation becomes more porous, by the action of formation water and dissolved ionic species (etching), the likelihood of oil migration into that formation increases. As the formation becomes less porous by occlusion, or precipitation, the possibility of recovering oil decreases. Thus, a study of the processes of etching and occlusion in a given formation can provide information on the porosity of the reservoir which can be used in making predictive models of the petroleum potential of the formation.

It is thus an object of the invention to determine the nature of the diagenetic processes occurring in subsurface formations. It is a further object to make models of subsurface formations in order to predict the likelihood of finding oil in the formation.

SUMMARY OF THE INVENTION

According to the invention, a substrate is placed in an underground earth formation in contact with formation fluids for a time sufficient to effect chemical and/or physical changes in the substrate which reflect the diagenetic processes occurring in the formation. The substrate is examined prior to placement in the formation and after recovery from the formation and a comparison of the physical and/or chemical characteristics of the substrate before and after exposure to reservoir fluids is made. From this comparison, predictions concerning the porosity of a formation and its petroleum potential are made.

DETAILED DESCRIPTION OF THE INVENTION

Figure 1:
FIG. 1 is a scanning electron micrograph showing etch pits and solution-enlarged cleavage planes in a calcite crystal. Magnification 2000X.

In the invention method, a mineral substrate is placed in a subterranean formation. The substrate can be any mineral, but is preferably a crystalline, rock-forming mineral. The substrate preferably is an optical-quality crystal having a polished face or cut along a natural cleavage plane so as to provide a smooth, clean surface for before and after comparison.

The choice of a substrate mineral depends upon the identity of the formation rock, the formation fluids, and the time available for substrate contact with the formation fluids. Preferred minerals for use in limestone formations include calcite, dolomite, quartz and anhydrite. For sandstone formations, the preferred minerals are, in addition to the above, feldspar and clay.

In selecting a substrate, it will generally be desirable to choose a mineral which is similar to that of the formation to be tested. It can generally be assumed that the fluid in the formation is in near-equilibrium with the mineral, and therefore choice of a mineral similar to that which characterizes the reservoir reduces the possibility that too-rapid erosion of the substrate by corrosive formation fluids will occur. For this reason also, it is helpful but not essential in choosing a suitable substrate to study a sample of the formation fluids if available.

The size of the substrate for use in the invention process is not critical so long as it is sufficiently large that it is not destroyed by corrosive formation fluids during the time of contact between the substrate and the fluids. Generally, the size of the substrate will range from about 1 mm to about 1 cm across the face.

The test face of the substrate, generally polished or cut along a natural cleavage plane to provide an essentially even planar surface, is preferably examined prior to the test. An electron microscope or other instrument can be used to examine the surface features of the mineral substrate in its original condition prior to exposure to formation fluids. A record, such as a photograph, is made of the condition of the mineral substrate in its original condition.

The substrate is then placed in a vessel suitable for introduction into the subterranean formation of interest and effective for protecting the substrate from drilling mud, petroleum and other well-base fluids until the desired depth is reached. The vessel is suitably a sealed pressure vessel of a non-corrosive metal. The vessel is advantageously of a construction similar to that of well equipment to be used in the formation so as to provide a means of predicting the effects of the reservoir conditions on the equipment, as a test which can be performed in conjunction with the invention method.

The substrate-containing vessel is then lowered into the subterranean formation of interest, generally through a borehole drilled for the recovery of oil or other natural fluids or for the purpose of testing subterranean conditions. The vessel is lowered to any depth desired. The invention method provides information about conditions in formations which are at a depth at which information is difficult to obtain by conventional methods. The method is particularly designed for depths deeper than about 5,000 feet below the surface.

If the bore through which the vessel is lowered is a producing or shut-in oil well, it will be necessary to lower the substrate-containing vessel through one or more oil zones for placement in an underlying water zone. As it is necessary to preserve the face of the mineral substrate in original form, the vessel must be fluid-tight and impervious to the oil or other fluids through which it passes en route to the water zone of interest.

After the vessel is lowered to the water zone of interest, the vessel is opened to the fluids so as to permit contact of the substrate with the formation fluid. This can be effected, for example, by means of a timer set to activate a door after a sufficient time for the vessel to reach the formation or by means of a remote signal from the surface.

The substrate is contacted with the formation fluids for a period of time at least sufficient for changes indicative of reservoir diagenesis to take place on the face of the mineral substrate. This time period can vary widely depending upon the mineral of the substrate and the formation fluids. For example, if the formation contains highly corrosive connate water and gases and the mineral is not similar to the native formation rock, the substrate could be dissolved after a period of no more than four hours. If the formation fluids are relatively non-corrosive and a compatible mineral, that is, one with which the formation fluids are in near-equilibrium, is chosen for the substrate, the time for substrate-fluid contact could be extended for 12 months or longer. Of course, the nature of the well site chosen for the test will often dictate the time available for the test, with producing wells offering little time for such a test and shut-in wells providing opportunities for long-term testing of ongoing diagenesis.

After sufficient time for substrate-fluid contact, fluids are expelled from the vessel by means, for example, of an inert gas under pressure and the vessel is closed by means, for example, of a timer or remote signal, and the vessel is returned to the surface. It may be desirable to use a vessel capable of enclosing a sample of the formation fluids for study, although it must be understood that changes in pressure and temperature as the vessel is brought to the surface will alter the composition and nature of the fluid.

After return of the vessel to the surface, the substrate is removed from the vessel and examined for any changes exhibited by the face of the mineral substrate. The tests run on the original substrate, such as examination under an electron microscope, are again performed to detect any alterations in the mineral face resulting from exposure to the formation fluids.

The principal diagenetic processes of interest in oil explorations are etching, or removal of rock by chemical processes, and occlusion, or deposition of minerals. Both processes affect the porosity of a rock formation, which is an indication of the likelihood of finding oil in the formation or the possibility of oil migration through the formation.

The recovered mineral substrate is examined for evidence, both visible and microscopic, of etching and overgrowth. Etching by formation fluids is reflected in the face of the mineral by, for example, corrosion at cleavage boundaries, etch pits and irregular topography. Occlusion is indicated on the mineral face by a crystalline mineral overgrowth. The mineral substrate may also exhibit signs of replacement of one mineral by another, which could be detected by an electron microscope having an x-ray attachment or elemental analysis.

The presence of etching in the substrate face indicates that the formation fluids are not in equilibrium with the substrate mineral. If the substrate mineral is identical or similar to the formation rock, it can be concluded that the same process indicated by the substrate face is occurring in the formation. If the substrate mineral is dissimilar from the formation rock, then the prediction must be based on the likelihood that the formation rock is more or less likely than the substrate mineral to be in equilibrium with the formation fluids.

In general, it can be predicted from a study of the recovered substrate that, if etching is exhibited, any formation rock from that mineral is undergoing dissolution and porosity is increasing. If, on the other hand, the substrate exhibits occlusion, any formation rock from that mineral is undergoing precipitation on its surfaces and the formation porosity is decreasing.

Predictions can be made concerning diagenesis in formations proximate to the one into which the substrate is lowered by making adjustments for pressure and temperature differences which would be expected between the tested formation and the formation of interest. For example, if a formation at 10,000 feet was found to be undergoing etching, an adjacent formation at 15,000 feet could be predicted, assuming a higher temperature and greater pressure for the formation, to be undergoing an increase in porosity at a greater rate than the tested formation.

The results of the study of the face of the substrate to predict porosity changes can be used along with other information about the formation gathered by conventional means such as laboratory measurements of fluid composition together with thermodynamic calculations to produce laboratory or computer simulations of formation conditions.

The invention method can also be used to detect the movement of oil into a reservoir by indicating relatively dramatic changes in corrosiveness from organic acids, which are theorized to be present in migrating oil and to precede a migrating oil bank.

Thus, the invention method provides means for determining if a formation is in equilibrium with connate fluids and, based upon the findings, to predict changes in the porosity of the formation and thereby obtain valuable information for oil prospecting.

The invention method also has utility in the study of geothermal wells. An understanding of the diagenetic processes occuring in a geothermal reservoir is valuable in assessing structural changes in and the energy potential of the reservoir. The process is basically similar to that for an oil-containing reservoir, although the requirements for the vessel in terms of its heat tolerance may as a rule be more stringent than for most oil reservoirs. The face of the substrate is examined for conditions indicative of changes in porosity occuring in the subterranean geothermal reservoir. The vessel can, as an aid in geothermal energy recovery, be examined as an indication of the effects of heat, pressure and scaling on metal equipment exposed to conditions in the geothermal well.

EXAMPLE

A laboratory experiment was carried out to simulate the effects anticipated when various substrates are exposed in-situ to reservoir fluids. Natural calcite ($CaCO_3$) was mechanically cleaved into rhombohedral crystals 2–5 mm across one face. These crystals were cemented to glass microscope slides with epoxy resin, so that a natural cleavage face on each crystal was exposed parallel to the slide. Such slides were prepared, numbered 1 to 3.

Fluid preparation involved adding 8.1 grams of $CaCO_3$ to 405 ml Barnstead Nanopure Water in a stirred Parr reaction vessel. A container of dry ice was connected with tubing to provide a $CO_2$ gas stream as the dry ice sublimed. The $CO_2$ was bubbled through the $CaCO_3/H_2O$ solution at 60° C. and stirred for 17 hours at a stirrer setting of 20%.

The calcite-saturated solution was filtered through a 1.0 μm Nucleopore filter and poured into a 250 ml Nalgene bottle to sufficient depth to cover one of the substrate slides described above, which were suspended above the bottom of the bottle with Teflon-covered wire. This bottle, containing slide #3 (attempted overgrowth) was placed in boiling water.

A second bottle, containing slide #1 (attempted etching) was filled to the same depth with a solution containing equal parts of (1) the calcite-saturated solution described above, and (2) water that had "distilled" with the $CO_2$ gas stream from the 60° C. solution in the Parr vessel described above. This bottle was maintained at room temperature.

Both bottles were provided with $CO_2$ above their solutions at a pressure of one atmosphere via the dry ice apparatus described above. Both bottles were stirred magnetically for four hours.

After four hours the glass microscope slides containing the calcite substrates were removed from the bottles and rinsed by dipping twice in Nanopure water. They were then dipped twice in acetone and air-dried. Samples described above were coated with a conductive gold coating and examined in a scanning electron microscope (SEM) for evidence of etching or overgrowth.

Figure 2:
FIG. 2 is a scanning electron micrograph showing a natural cleavage of an untreated sample of calcite crystal. Magnification 2000X.
Figure 3A:
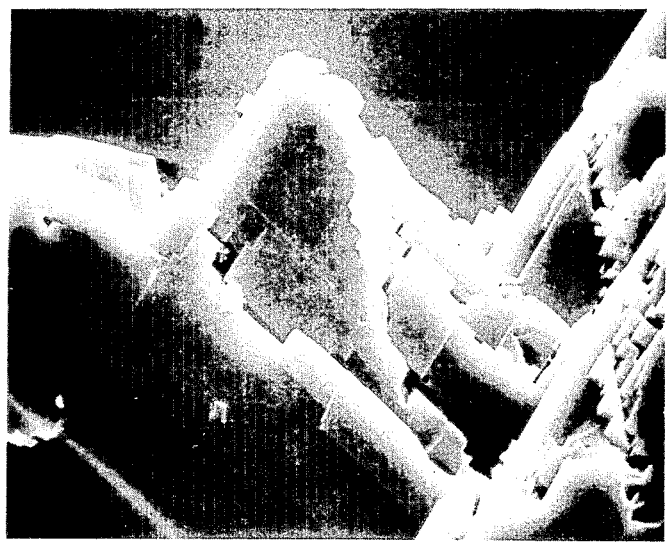
FIG. 3a is a scanning electron micrograph showing angular calcite overgrowths on a cleavage face of a calcite crystal. Magnification 2000X.
Figure 3B:
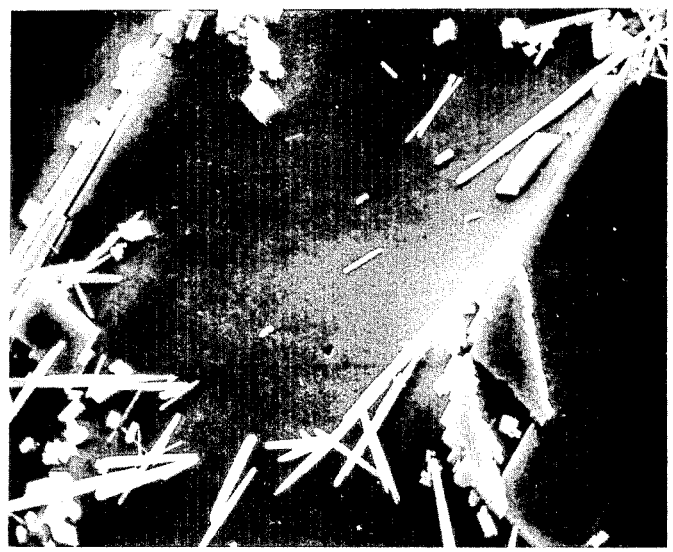
FIG. 3b is a scanning electron micrograph showing a smoothly overgrown cleavage face of a calcite crystal, with small rhombohedral calcite crystals and acicular crystals of probable aragonite. Magnification 1000X.

Examination of scanning electron micrographs revealed etch pits, valleys produced by enlargement of cleavage planes, and slightly-rounded protrusions (Slide 1, FIG. 1). These features are not visible in micrographs of the unaltered sample (Slide 4, FIG. 2). Etching of the surface was produced by the experiment. Examination of the micrographs of the other samples revealed angular crystals, presumably calcite overgrowths (Slide 3, FIG. 3). Also present were acicular crystals which may be calcite or aragonite (a $CaCO_3$ polymorph). These features are not visible in micrographs of the unaltered sample (Slide 4, FIG. 2). Overgrowth of the surface was produced by the experiment.

I claim:

1. A process comprising
   placing a mineral substrate selected from the group consisting of calcite, dolomite, quartz, anhydrite and feldspar, the mineral substrate having an essentially even planar face, within a fluid-tight vessel into a subterranean earth formation containing connate formation fluids;
   causing the mineral substrate to be exposed to the connate formation fluids present;
   permitting contact of the mineral substrate by the connate formation fluids for at least a time sufficient to effect occlusion or etching on said face of the substrate;
   withdrawing the mineral substrate within the vessel from the formation;
   removing the substrate from the vessel and examining the mineral substrate for indications of occlusion or etching on said face of the mineral substrate;
   comparing said face of the mineral substrate as placed into the formation with said face of the mineral substrate as withdrawn from the formation; and
   determining from the occlusion or etching of the withdrawn substrate a property of the formation.

2. The process of claim 1 in which the mineral substrate is placed into the subterranean earth formation through a borehole.

3. The process of claim 1 which also comprises making an electron microscope-enhanced photograph of the mineral substrate as injected into the formation and as withdrawn from the formation.

4. The process of claim 1 in which the subterranean earth formation is a geothermal reservoir.

5. The process of claim 1 which further comprises examining the mineral substrate microscopically after removing it from the subterranean earth formation.

6. The process of claim 5 which comprises determining changes in porosity of the formation.

7. The process of claim 1 which comprises
   lowering the mineral substrate into the formation through a borehole, the substrate being contained within a sealed, fluid-tight vessel;
   opening the vessel after the vessel is in place in the formation so as to expose the sample to the connate fluids;
   permitting contact between the connate formation fluids and the substrate for at least a time sufficient to effect depositional or erosional changes in the face of the substrate;
   expelling fluids from and closing the vessel; and
   raising the substrate-containing vessel to the surface.

8. The method of claim 7 in which the mineral substrate is quartz.

9. The method of claim 7 further comprising subjecting the recovered substrate to elemental analysis.

* * * * *